D. P. LAKE.
STENCIL-PLATES.
No. 179,574.   Patented July 4, 1876.
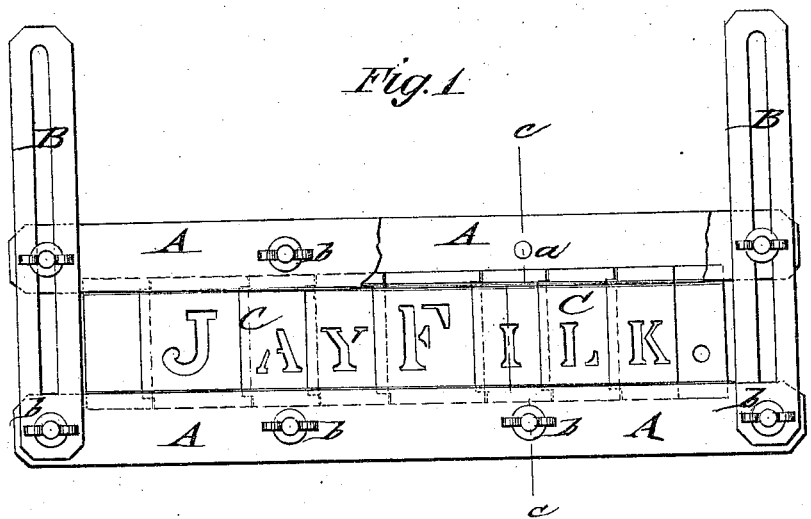
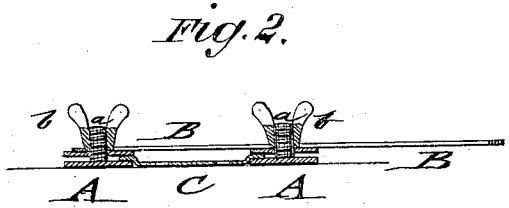
WITNESSES:   INVENTOR:
Francis McArdle,   D. P. Lake
John Goethals   BY
   ATTORNEYS.

UNITED STATES PATENT OFFICE.

DAVID P. LAKE, OF HELENA, MONTANA TERRITORY.

IMPROVEMENT IN STENCIL-PLATES.

Specification forming part of Letters Patent No. 179,574, dated July 4, 1876; application filed May 16, 1876.

*To all whom it may concern:*

Be it known that I, DAVID P. LAKE, of Helena, Lewis and Clarke county, Montana Territory, have invented a new and Improved Stencil-Frame, of which the following is a specification:

Figure 1 represents a top view of my improved stencil-frame; and Fig. 2, a vertical transverse section of the same on line $c\ c$, Fig. 1.

Similar letters of reference indicate corresponding parts.

My invention relates to an improved stencil-frame, that is adjustable to letters of different sizes and to any number of lines; and the invention consists of a letter-frame made of lateral clamping-plates, slotted and pivoted side guide-pieces, and clamp-screws.

In the drawing, A A represent a number of lateral double plates, that are clamped together to hold the letters inserted between the same by bolts $a$, fixed to the lower plates, and screw-nuts $b$, binding on the upper plates. The slotted and swinging side guide-plates B serve to adjust the double plates to greater or lesser distance from each other, adapting them to any size of stencil-letters, C, and admitting the arrangement of several lines of letters by providing a number of double plates, A, parallel to each other.

By swinging the side guides from the rectangular position to an angle of inclination with the lateral clamp-plates the distance between the latter is decreased, and the plate thereby readily set to smaller letters.

The stencil-letters C are made with suitably-raised top and bottom edges and interlocking side recesses, for the purpose of being quickly inserted alongside of each other in the lower clamp-plate, and finally to the upper clamp-plates, the screws being tightened when the letters are arranged.

The letters have to be machine-cut, with pressed edges, so as to fit nicely together, and may be arranged in any combination of words, and clamped rigidly together, to be used for stenciling.

Having thus described my invention, I claim as new and desire to secure by Letters Patent—

An improved stencil-frame, composed of lateral double plates, pivoted and slotted side guide-plates, and suitable clamp-screws, to secure any number, size, and arrangement of stencil-letters, substantially as specified.

DAVID PORTER LAKE.

Witnesses:
ADRIEN NAPPY,
G. L. JOHNSTON.